(12) United States Patent
Miksic et al.

(10) Patent No.: US 6,174,461 B1
(45) Date of Patent: Jan. 16, 2001

(54) CONCRETE SEALERS WITH MIGRATING CORROSION INHIBITORS

(75) Inventors: Boris A. Miksic, North Oaks; Charles M. Suchy, Blaine; Margarita Kharshan, Little Canada, all of MN (US)

(73) Assignee: Cortec Corporation, St. Paul, MN (US)

(*) Notice: Under 35 U.S.C. 154(b), the term of this patent shall be extended for 0 days.

(21) Appl. No.: 09/342,436

(22) Filed: Jun. 29, 1999

Related U.S. Application Data

(63) Continuation-in-part of application No. 09/031,845, filed on Feb. 27, 1998, now abandoned.

(51) Int. Cl.⁷ .............................. C09K 3/00; C04B 41/46; C04B 41/49
(52) U.S. Cl. .................. 252/389.32; 252/389.3; 252/389.31; 252/390; 252/392; 106/14.13; 106/14.14; 106/14.15; 106/14.18; 106/14.21; 106/14.41; 106/14.42; 106/14.44; 427/136
(58) Field of Search ...................... 252/389.32, 389.31, 252/390, 392; 106/14.15, 14.18, 14.21, 14.41, 14.42, 14.44; 427/136

(56) References Cited

U.S. PATENT DOCUMENTS

| | | |
|---|---|---|
| 4,153,743 | 5/1979 | Caramanian . |
| 4,342,796 | 8/1982 | Brown et al. . |
| 4,460,625 | 7/1984 | Emmons et al. . |
| 4,525,213 | 6/1985 | Linn . |
| 5,092,923 | 3/1992 | Dillard et al. . |
| 5,246,495 | 9/1993 | Helmstetter . |
| 5,422,141 | 6/1995 | Hoopes et al. . |
| 5,597,514 | 1/1997 | Miksic et al. . |
| 5,750,053 | 5/1998 | Miksic et al. . |

*Primary Examiner*—Jerry D. Johnson
(74) *Attorney, Agent, or Firm*—Haugen Law Firm PLLP

(57) ABSTRACT

A concrete sealer material is provided containing a corrosion inhibitor which is free to migrate upon leeching from the concrete sealer. The inhibitor retards the rate of corrosion of reinforcements contained within the concrete, including metallic mesh, grid, rebar, and other metallic articles utilized for reinforcement. The sealer material is preferably a film forming component of silicate or silane modified siloxanes. The corrosion inhibitor is preferably an amine salt, an amino alcohol, alkalized salt of glucoheptonates, or, calcium nitrite and mixtures thereof. A compatibility enhancer of an aminoalkyl silane can be added to the blend.

8 Claims, No Drawings

CONCRETE SEALERS WITH MIGRATING CORROSION INHIBITORS

CROSS-REFERENCE TO RELATED APPLICATION

The present application is a Continuation-In-Part of our pending application Ser. No. 09/031,845 filed Feb. 27, 1998 entitled "CONCRETE SEALERS WITH MIGRATING CORROSION INHIBITORS" and assigned to the same assignee as the present invention now abandoned.

BACKGROUND OF THE INVENTION

The present invention relates generally to a formulation for providing corrosion protection to metallic reinforcement members in concrete. More particularly, the present invention relates to a formulation and method for employing concrete sealers containing migrating corrosion inhibitors together with a component for enhancing the compatibility of the sealer component with the inhibitor component for the purpose of providing long-term protection to metallic reinforcement members contained within the body of the concrete structure.

In U.S. Pat. No. 5,597,514 (hereinafter the "'514 patent"), assigned to the same assignee of the present invention, a process is described in which corrosion inhibitors are added to the raw concrete mixture to provide for long term corrosion protection of the surfaces of the metallic reinforcement members. Pursuant to the processes of the '514 patent, corrosion inhibitors are added at an amount sufficient to provide long term protection to the metallic reinforcement for extended periods of time. This process is adapted very well for use with fresh or new concrete and presently is being widely used throughout the world.

In accordance with the present invention, formulations have been developed for use as surface treatments on existing concrete structures to form coatings and/or sealers which contain corrosion inhibitors. This seal coat protects the concrete while resisting penetration of harmful chemicals and at the same time slowly releases corrosion inhibition chemicals into the concrete, thus protecting the embedded metallic reinforcements. When used in combination with concrete which contained corrosion protection as described in U.S. Pat. No. 5,597,514, a more effective system is provided.

The present system of sealers or seal coating formulations containing corrosion inhibitors in accordance with the present invention is especially useful with older or exposed concrete structures in need of a means of retarding the ongoing metallic corrosion.

Parking ramps, bridges, driveways, and garage floors that typically require sealing and resealing are typical applications for the present system. Indeed, the formulations of the present invention have been found to be highly useful and perform exceptionally well when utilized on concrete surfaces which have undergone surface checking or the like, or alternatively have experienced some erosion or loss of surface. The formulation is effective because of enhanced compatibility of the components leading to equally enhanced performance.

It is common practice to utilize salts such as sodium chloride and/or calcium chloride as a component to lower the freezing point of ice and/or snow, and these materials have created persistent problems in structures such as parking ramps, bridges, and driveways. Because of the corrosive nature of these salts, damage to metallic reinforcements including rebar, mesh, screen, and the like has occurred. Deterioration of the concrete structure follows, and extensive repairs and occasionally rebuilding of the structures must be undertaken. Because the use of these chemicals is constantly increasing, and since the corrosion to the metallic reinforcements proceeds without interruption and on a constant basis, systems and/or techniques are required in order to either arrest and/or retard the chemical reactions which occur and lead to the deterioration of the reinforcements and ultimately to the concrete structures per se.

Reinforced concrete structures are typically provided with steel bars and/or rods (rebar) for longitudinal tension reinforcement as well as compression reinforcement, and reinforcement against diagonal tension. Expanded metal, steel-wire mesh, hoop iron or other thin rods may be embedded in the concrete structure for reinforcement purposes. Being ferrous-based materials, and as indicated hereinabove, the integrity of the reinforcement is subject to deterioration whenever exposure to chloride-containing salts, oxides of sulfur or nitrogen occurs. When mixtures containing the formulations of the present invention are utilized in sealing the concrete, significant protection of the reinforcement is obtained due to the passivating effect of the migrating corrosion inhibitor on the embedded metal, which leads to a significantly lower rate of deterioration.

Because the nature and properties of concrete structures limit and/or bar ready access to the interior of the structure, coating the exterior surface provides a mechanism for reducing the ingress of corrosive materials and thus reduce the rate of the reactions occurring along the surfaces of the metallic reinforcements. The exterior surfaces provide a host location and invasive point for the corrosive salts. Since these surfaces are normally exposed and available for coating, the preparation and utilization of desired sealers and/or seal coats containing corrosion inhibitors in accordance with the present invention may be undertaken. The seal coat formulations of the present invention have sealing properties matched to the task, and are tough and durable, and hence are capable of providing reasonably long term protection for concrete structures. The corrosion inhibiting components of these same formulations show enhanced compatibility with the sealer components with the result being improved performance of the overall combination.

The formulations of the present invention provide coatings, which when cured, provide a desirable balance of properties with respect to porosity, water absorption and water resistance. While most coating formulations compounded for the coating of concrete exhibit a certain amount of porosity, it has been found that a certain degree of porosity may be a desirable feature for the coating, particularly when applied directly onto the host surface. Thereafter, one or more additional coatings may be applied to the surface in order to assist in forming an appropriate seal. The use of a coating formulation which provides a modest amount of porosity has been found to provide more rapid and controllable leaching of the corrosion inhibiting component into the bulk of the concrete being protected. In other words, the film forming component of the coating applied directly to the surface of the concrete has a modest tendency to provide a porous surface in order to permit initial leaching or slow migration of the corrosion inhibiting chemical from the body of the film to the surface of the concrete. Thereafter, the leached corrosion inhibitor migrates from the surface to the internal portions of the concrete structure. By way of example, excessive porosity is undesirable, and may be controlled and/or avoided by multiple coatings or selection of formulation materials such as coatings having a high degree of toughness, ability to fill holes, and to otherwise protect the concrete surface. Formulations based substantially on sodium silicate have shown an ability to seal concrete through filling of pores and/or holes, and this affects migration of the migrating corrosion inhibitor substantially. Other coating bases such as silicone (siloxane) with higher solids and one trip coatings have been found to provide uniform and sound coatings. However, the ability to seal the surface and fill holes in the substrate does not perform as well as multiple coatings with sodium silicate base materials, and the corrosion inhibitor migrated at a significantly more rapid rate. For certain applications, however, such a coating may be helpful in providing a material for reaching the metallic reinforcements at an earlier point in time. The formulations of the present invention further include a compatibility enhancing component which enhances the performance of the overall sealant/inhibitor formulation by enhancing the compatibility of the individual components.

SUMMARY OF THE INVENTION

By way of summary, the formulations of the present invention are a mixture of corrosion inhibiting chemicals in combination with sealants such as silicates and silane modified siloxanes, and further including an amino silane which has been found to enhance compatibility of the sealant and corrosion inhibitor. Sealant coatings such as silicates are typically and preferably applied in several coats as a means of providing greater protection to the concrete surface against erosion. Initial seal coats are typically applied to the surface of partially set or cured concrete structures, with these initial seal coats being utilized to control the loss of water from the raw concrete through evaporation prior to its achieving a more complete cure of the cement component. The corrosion inhibiting components of the formulations of the present invention do not interfere with the primary purpose of the sealant forming the coating and at the same time provide a source of downward migrating inhibitors that protect the metallic reinforcements. The corrosion inhibitors are typically included in the sealants as delivered to the application site. The amino silane component enhances the corrosion inhibiting capabilities of the formulation.

DESCRIPTION OF THE PREFERRED EMBODIMENTS

In accordance with the preferred embodiment of the present invention, a typical sealant, such as a commonly used silane/siloxane silicone emulsion (or silicate mixture) is selected. Commercially available silane modified siloxane sealants found especially useful are offered under the trade designation "Tegosivin HE 899K" from Goldshmidt Chemical Corporation of Hopewell, Va., or under the trademark "Aqua-Trete Emulsion EM" from Huls America, Inc. of Piscataway, N.J. The sealant is mixed with a selected corrosion inhibiting chemical at a ratio of 100 parts sealer to 1 to 5 parts inhibitor. Inhibitors that have proven most useful are $Ca(NO_2)_2$, amino alcohols, amine salts and the glucoheptonate salts as described in U.S. Pat. No. 5,597,514. An amino silane type chemical such as aminoethyl-aminopropyltrimethoxysilane enhances the compatibility. Such a silane is available commercially from Dow Corning of Midland, Michigan under the trademark Z-6020.

In order to more fully describe the various features of the present invention, the following examples are provided:

EXAMPLE I

A corrosion inhibiting silane/siloxane sealant was prepared in accordance with the following formulation:

| Component | Percentage by Weight |
| --- | --- |
| Silane/siloxane emulsion (Tegosivin HE 899K) | 25% |
| Dimethylethanolamine | 3% |
| Aminocarboxylate | 0.5% |
| Water | 71.5%. |

This formulation was utilized as a concrete sealer and provided an effective barrier and a source of concrete rebar inhibiting chemicals as the inhibitors slowly migrated downward into the concrete.

By way of further explanation, the formulation of Example I may be satisfactorily blended in accordance with the following:

| Component | Percentage by Weight |
| --- | --- |
| Silane/siloxane emulsion (Tegosivin HE 899K) | 20–25% |
| Dimethylethanolamine | 1–5% |
| Aminocarboxylate | 0.3–0.8% |
| Water | 75–80%. |

In laboratory testing, the sealer of Example I was applied to the surface of concrete specimens. When subjected to a dammed surface solution of 3.5% salt water, the sealer showed that within seven days the embedded rebar were being protected as indicated by impedance measurements at a point along the rebar located 1.5 inches below the surface.

EXAMPLE II

A typical silicate sealant was prepared in accordance with the following formulation:

| Component | Percentage by Weight |
| --- | --- |
| Dimethylethanolamine | 1–5% |
| Sodium silicate | 11–15% |
| Surfactant | .1–.5% |
| Water | 85–89%. |

In laboratory testing as described above, this sealant inhibitor formulation retained the inhibitors to a higher degree. At a seven-day level, inhibitor presence was being recorded at the rebar anode and cathode one-quarter inch below the surface.

EXAMPLE III

A corrosion inhibiting sealant with enhanced compatibility was prepared in accordance with the following formulation:

| Component | Percentage by Weight |
| --- | --- |
| Silane-siloxane, Commercially available as Aqua-Trete Emulsion from Huls America, Inc. of Piscataway, NJ. | 80% |

-continued

| Component | Percentage by Weight |
|---|---|
| Amino silane aminoethyl-aminopropyltrimethoxysilane: (available commercially as Dow Corning Z-6020) | 5% |
| Gluconic acid | 2.5% |
| Sodium glucoheptonate | 2.5% |
| Amino-propanol | 2% |
| Water | 10% |

The gluconic acid/sodium glucoheptonate is typically added to the formulation in a range of about 5%, with the gluconic acid component preferably being blended with sodium glucoheptonate in a range of between about 60:40 and about 40.60. The amino silane has been found effective in ranges of from between about 4% and 6%.

Other amino silanes may be employed in addition to or alternatively to aminoethyl-aminopropyltri-methoxysilane. As an example, other aminoalkyls including a lower aminoalkyl such as aminoethylpropyl trimethoxysilane may be utilized, with this material being available commercially from Dow Corning of Midland, Michigan under the trademark Z-6094. Also 3-aminopropyl trimethoxysilane (available commercially from Dow Corning as Z-6011) may be found useful. Blends of such aminoalkyl silanes may also be effectively employed.

This formulation proved to be an effective sealer and system for providing migrating corrosion inhibitors to concrete, and was effective when applied on a single coat basis to the concrete surface.

EXAMPLE IV

A corrosion inhibiting sealant was also prepared in accordance with the following formulation:

| Component | Percentage by Weight |
|---|---|
| Silane/siloxane emulsion (Tegosivin HE 899K) | 20–25% |
| Ca(NO$_2$)$_2$ | 1–5% |
| Water | 70–79%. |

A variety of surfactants may be suitably employed, and those skilled in the art may select appropriate emulsifiers which demonstrate compatibility with the other components, including in particular the film-forming components.

GENERAL DISCUSSION

As has been indicated, the utilization of the formulations based upon mixtures in accordance with the present invention, enhance the lifetime of metallic reinforcement so as to preserve the integrity of concrete structures, particularly bridges and parking facilities.

The widespread utilization of chloride-containing salts such as sodium chloride and/or calcium chloride, while necessary for safety purposes, have been detrimental to the integrity of reinforced concrete structures. The ice and snow carried by automobiles in the wintertime invariably bring certain residual amounts of these chloride-containing materials onto areas which are not normally exposed, but which nevertheless are adversely affected by relatively rapid deterioration of the metallic reinforcements when in contact with these salts in the presence of water.

It will be appreciated that various modifications may be made in the present invention, and that the formulations provided hereinabove are deemed representative only and are not to be deemed limiting for the true spirit and scope of the invention.

What is claimed is:

1. The method of retarding the rate of corrosion of metallic reinforcements in concrete structures which comprises the steps of:
    (a) applying a substantially continuous coating of a concrete sealer formulation to the surfaces of a concrete structure wherein the concrete sealer formulation comprises a working solution of a solvent mixture together with:
        (i) an air-drying film forming sealant component selected from the group consisting of silicates, silane modified siloxanes;
        (ii) a corrosion inhibitor selected from the group consisting of amine salts, amino alcohols, alkali salts of glucoheptonates, and Ca(NO$_2$)$_2$; and
        (iii) the film forming sealant component is present in said working solution in an amount ranging from between 10% and 25% by weight, the corrosion inhibitor is present in said working solution in an amount ranging from 0.5% to 5% by weight, the balance being film-forming component compatible solvent.

2. The method as defined in claim 1 being particularly characterized in that the film-forming component is silane/siloxane emulsion, and wherein the corrosion inhibitor is a blend of dimethylethanolamine and aminocarboxylate.

3. The method as defined in claim 1 being articularly characterized in that said film-forming component is sodium silicate and wherein said corrosion inhibitor is dimethylethanolamine.

4. A method as defined in claim 1 being particularly characterized in that an aminoalkyl silane is added to said working solution in a range of between about 4% and 6% amino silane by weight to said formulation.

5. The method as defined in claim 4 being particularly characterized is that said aminoalkyl silane is a lower aminoalkyl consisting essentially of aminoethyl-aminopropyltri-methoxysilane.

6. A formulation for application to the surface of concrete structures for retarding the rate of corrosion of metallic reinforcements in such concrete structures which comprises:
    (a) a solvent mixture of an air-drying film forming coating component selected from the group consisting of silicates and silane modified siloxanes;
    (b) a corrosion inhibitor selected from the group consisting of amine salts, amino alcohols, alkali salts of glucoheptonates, and Ca(NO$_2$)$_2$;
    (c) an aminoalkyl silane component; and
    (d) said film forming coating component is present in a working solution in an amount ranging from between 10% and 24% by weight, the corrosion inhibitor is present in said working solution in an amount ranging from 0.5% to 5% by weight, the aminoalkyl silane is present in an amount ranging from between about 4% to 6% by weight, the balance being film-forming component compatible solvent.

7. The formulation of claim 6 being particularly characterized in that said film-forming coating component is silane/siloxane emulsion, and wherein the corrosion inhibitor is a blend of dimethylethanolamine and aminocarboxylate.

8. The formulation as defined in claim 6 being particularly characterized in that said film-forming coating component is sodium silicate and wherein said corrosion inhibitor is dimethylethanolamine.

* * * * *